United States Patent [19]

Kawasaki et al.

[11] Patent Number: 4,829,209
[45] Date of Patent: May 9, 1989

[54] ULTRASONIC MOTOR WITH STATOR PROJECTIONS AND AT LEAST TWO CONCENTRIC RINGS OF ELECTRODES

[75] Inventors: Osamu Kawasaki, Kyoto; Ritsuo Inaba, Neyagawa; Akira Tokushima, Kyoto; Katsu Takeda, Osaka, all of Japan

[73] Assignee: Matsushita Electric Industrial Co., Ltd., Kadoma, Japan

[21] Appl. No.: 126,105

[22] PCT Filed: Feb. 17, 1987

[86] PCT No.: PCT/JP87/00102
§ 371 Date: Nov. 20, 1987
§ 102(e) Date: Nov. 20, 1987

[87] PCT Pub. No.: WO87/05166
PCT Pub. Date: Aug. 27, 1987

[30] Foreign Application Priority Data

Feb. 18, 1986 [JP] Japan .................. 61-34624
Feb. 20, 1986 [JP] Japan .................. 61-35959
Feb. 20, 1986 [JP] Japan .................. 61-35960
Feb. 20, 1986 [JP] Japan .................. 61-35954
Feb. 20, 1986 [JP] Japan .................. 61-35962
Feb. 20, 1986 [JP] Japan .................. 61-35963

[51] Int. Cl.⁴ ............................ H01L 41/08
[52] U.S. Cl. ...................... 310/323; 310/317; 310/328
[58] Field of Search ............ 310/316, 317, 323, 328

[56] References Cited

U.S. PATENT DOCUMENTS 4,484,099 11/1984 Kawai et al. ............. 310/323 X
4,562,374 12/1985 Sashida .................. 310/323 X
4,678,956 7/1987 Izukawa et al. ........... 310/323
4,692,651 9/1987 Hiramatsu et al. ......... 310/323
4,739,212 4/1988 Imasaka et al. ........... 310/323

FOREIGN PATENT DOCUMENTS 59-117473 7/1984 Japan .
59-178988 10/1984 Japan .

Primary Examiner—Mark O. Budd
Attorney, Agent, or Firm—Cushman, Darby & Cushman

[57] ABSTRACT

In an ultrasonic motor wherein an elastic travelling wave is excited in a vibrating stator comprising a piezoelectric element and an elastic element thereby to drive and a rotor which is disposed to touch the vibrating stator with pressure by friction forces, an ultrasonic motor having high efficiency is obtained. In the present invention, the above-mentioned vibrating stator is substantially disk-type, electrodes being provided to the piezoelectric element are disposed in a form of two sets of concentric circles having different phases with respect to each other in a circumferential direction in which the vibration is travelling, and have a constitution which excites the vibrating stator by flexural vibration modes of second order or higher in a radial direction and of third order or higher in the circumferential direction, and also, are designed so that at least mechanical impedances seen from each electrode become equal. By superimposing standing waves of the flexural vibration which are excited by those two sets of electrodes, the flexural vibration is made to travel in the circumferential direction, thereby to obtain a driving force.

6 Claims, 4 Drawing Sheets

FIG. 1
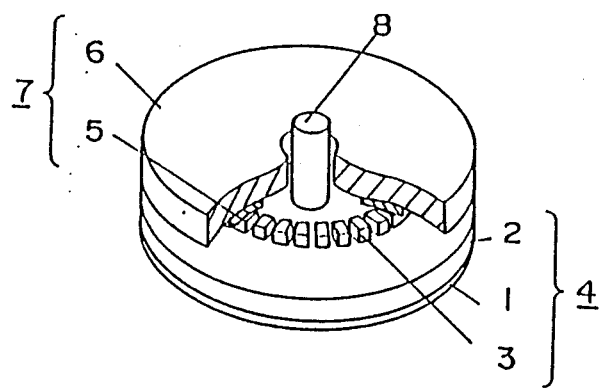
FIG. 2
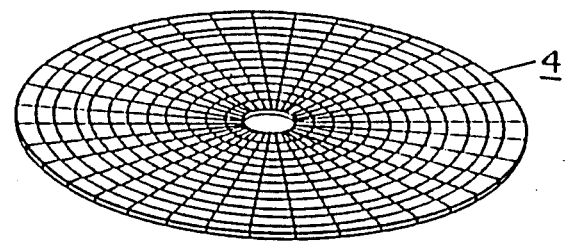
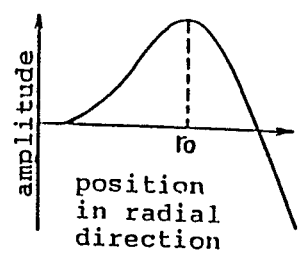

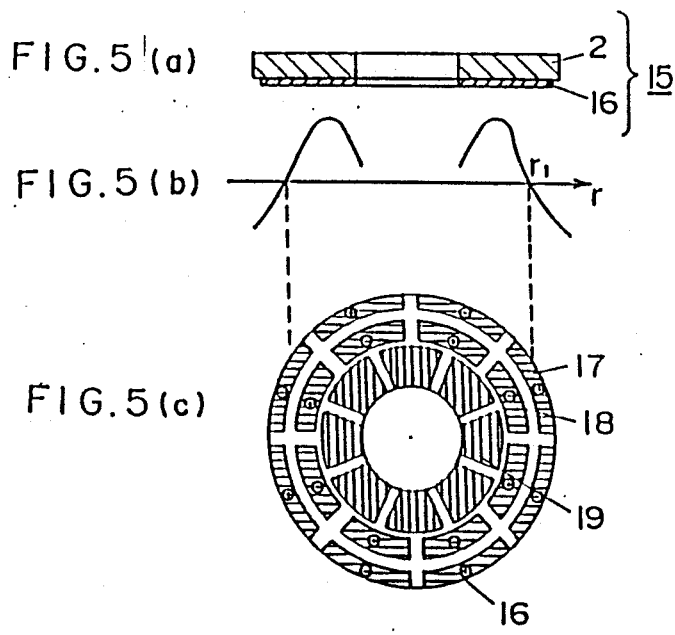
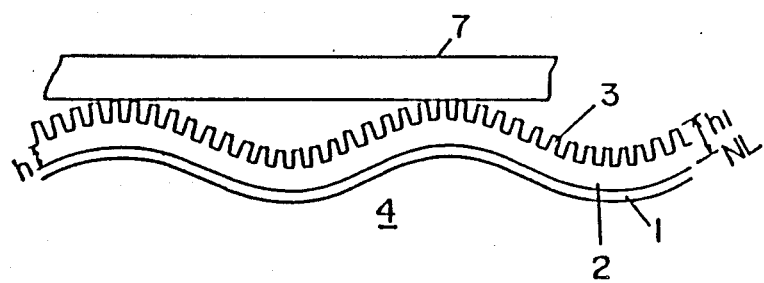

ULTRASONIC MOTOR WITH STATOR PROJECTIONS AND AT LEAST TWO CONCENTRIC RINGS OF ELECTRODES

BACKGROUND OF THE INVENTION

1. Field of the Art

The present invention relates to an ultrasonic motor wherein the driving force is given by elastic travelling wave excited by a piezoelectric element.

2. Description of the Prior Art

An ultrasonic motor is made with a vibrating stator which comprises a piezoelectric element and an elastic element and a rotor which is disposed to touch the vibrating stator with pressure. For instance, in U.S. Pat. No. 4,562,374, an embodiment using a vibrating stator which comprises a ring-shaped piezo-electric element and an elastic element is described. In the above-mentioned piezoelectric element, two electrode-groups, having a phase difference of 90° in position in a circumferential direction, are provided. By applying two alternating voltages having the phase differences of 90° to these electrode-groups, an elastic travelling wave is excited in the vibrating stator, and thereby the rotor rotates by friction forces.

Travelling wave is represented as follows:

$$\xi = \xi_0 \cos(\omega t - kx) \quad (1)$$
$$= \xi_0(\cos(\omega t)\cos(kx) + \sin(\omega t)\sin(kx))$$

where:
- $\xi$; Amplitude of travelling wave,
- $\xi_0$; Instantaneous value of amplitude,
- $\omega$; Angular frequency, t; Time,
- k; Wave number, x; Position.

Hereupon, when the above-mentioned ring-shaped vibrating stator is used, an area of the piezoelectric element responding to one electrode-group is small, because width in a radial direction is narrow and two electrode-groups are disposed to divide regions in the circumferential direction. Therefore, the driving force for exciting vibrations of one phase is not sufficient, and it is thereby difficult to obtain high driving efficiency.

On the other hand, there is another embodiment of vibrating stator for an ultrasonic motor, as is disclosed by a Japanese Unexamined Published Application Sho No. 60-183982 in which an elastic element and two slices of piezoelectric element are bonded coaxially into three layers. These two slices of piezoelectric element are disk-shaped, each of them is applied with voltage individually, and are superimposed in a manner that phases of excited vibration differ by 90° thereby. Therefore, area of the piezoelectric element which supplies a driving force for excitation is large, and its efficiency is high.

However, since impedances seen from electric terminals of the two slices of the piezoelectric elements are different, when they are driven by voltages of same amplitude and different phases by 90°, not only the travelling wave but also standing waves are excited in the vibrating stator as is obvious from equation (b 1). Generation of these standing waves causes lowering of the driving efficiency of the ultrasonic motor.

Futhermore, in another embodiment of vibrating stator, for the above-mentioned Japanese Unexamined Published Application Sho No. 60-183982, what comprises the elastic element and a slice of piezoelectric element, and forms concentric circle-shaped electrodes comprising two regions on the one slice of piezoelectric element, are disclosed. Different phase vibrations are excited by the voltages which are applied to those electrodes. Since this vibrating stator also does not make matching of impedances of two electrode-groups having phase difference of 90° and signals of electric charge excited by the vibration are not taken into account, when the vibrating stator is driven by same amplitudes and different phases by 90°, not only the travelling wave but also the standing waves are excited in the vibrating stator.

SUMMARY OF THE INVENTION

An object of the present invention is to offer an ultrasonic motor which obtains high efficiency by optimizing two sets of electrode-groups having different phases in position.

According to the present invention an elastic travelling wave is excited in a vibrating stator which comprises a piezoelectric element and an elastic element. A rotor is disposed to touch the vibrating stator with pressure is driven by friction forces. The vibrating stator is made substantially disk-shaped and electrodes attached to the piezoelectric elements are disposed in two sets of concentric arrangement having different phases from each other in a circumferential direction, and the electrodes have a constitution which excite the vibrating stator by means of flexural vibration mode of second order in the radial direction and that of third order in the circumferential direction. Also, mechanical impedances seen from respective electrodes are set to be equal and the flexural vibration is made to travel in the circumferential direction by superimposition of the standing waves of the flexural vibration excited by the two sets of electrodes.

BRIEF DESCRIPTION OF THE DRAWINGS

FIG.1 is a partially cut-out perspective view of an embodiment of a disk type ultrasonic motor in accordance with the present invention;

FIG.2 is a perspective view for explaining operation of the embodiment of FIG.1.

FIG.5(a), (b) and (c) are cross sectional view of a vibrating stator of a disk type ultrasonic motor of another embodiment, displacement distribution graph of the same and the plane view showing the constitution of electrodes of the same, respectively;

FIG.6 is a cross sectional view showing operation of a main part of the vibrating stator of the embodiment in accordance with the present invention;

DETAILED DESCRIPTION OF THE PREFERRED EMBODIMENT

Figure 3A:
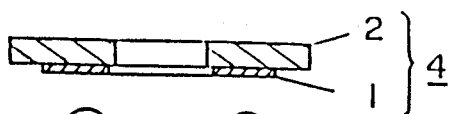
FIG.3(a), (b) and (c) are cross sectional views of the vibrating stator of the embodiment of FIG.1, displacement distribution graph of the same and a plane view showing a constitution of electrodes of the same, respectively.

In the following, the preferred embodiment of the present invention is explained in detail in compliance with the drawings.

FIG.1 is a cut-out perspective view of a disk type ultrasonic motor. In the figure, 1 is a piezoelectric element of a piezoelectric ceramic etc., 2 is an elastic element of an iron or aluminum etc.. 3 is projections which is for taking mechanical outputs and is disposed on a surface of the elastic element 2. The piezoelectric element 1 and the elastic element 2 are bonded concentrically to constitute the vibrating stator 4. 5 is an wear-resistive frictional material, 6 is an elastic element, and a rotor 7 is constituted by bonding them together. The projections 3 which are disposed on the vibrating stator 4 and the rotor 7 are made contacted with pressure with the frictional material 5 therebetween. When a driving voltage is applied to the piezoelectric element 1, an elastic travelling wave is excited in the vibrating stator 4, and are amplified mechanically by the projections 3, and thereby the rotor 7 is driven by friction forces via the frictional material 5. The rotor 7 rotates around a rotation shaft 8.

FIG.2 is a figure of vibration mode and an amplitude distribution in radial direction of the above-mentioned disk type ultrasonic motor. Vibration mode shown in the figure adopts a flexural vibration mode of second order in radial direction and a third order in circumferential direction. Since at least three vibrating loops are required for holding the vibrating stator 4, the flexural vibration modes of second order or higher in the radial direction and third order or higher in the circumferential direction are applicable similarly. In the figure, $r_o$ is a position which is a loop of the flexural vibration where amplitude is maximum. Since a rotation speed of the rotor of the ultrasonic motor is proportional to a vibrating amplitude of the vibrating stator, the maximum rotation speed can be obtained by setting the rotor to touch the loop of vibrations. Therefore, the projections 3 are normally disposed in this position.

Figure 3B:
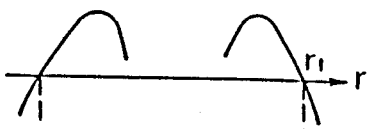
Figure 3C:
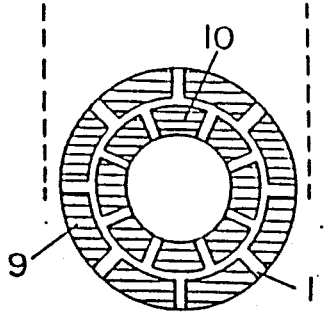

FIG.3 shows displacement distribution graph of the vibrating stator 4 and a constitution of electrode of the piezoelectric element 1 for the disk type ultrasonic motor shown in FIG.1. Electrode-groups A 9 and B 10 are constituted concentrically within a nodal circle of flexural vibrations of the vibrating stator 4, and consist of small electrode-groups, wherein circumferential direction lengths correspond to half wavelengths of the elastic travelling wave, respectively. And the electrode-groups A 9 and B 10 are disposed with phase difference 90° in location in the circumferential direction. An electrode on the surface which is opposite to the surface shown in the figure is a flat-electrode. Polarization directions of small electrode parts which form the electrode-groups A 9 and B 10 and are adjacent each other are reversed in a thickness direction. When using, the electrode-groups A 9 and B 10 are short-circuited, respectively, and alternating voltages with different phases by 90° are applied thereto, respectively, so that the flexural vibration which travels in the circumferential direction is excited. Then, if respective electrode areas are designed with respect to widths in the radial direction so as to make induced electric charges in the electrode-groups A 9 and B 10 by the above-mentioned flexural vibration equal (i.e. by making mechanical impedances equal), elastic travelling wave having a same amplitude can be excited by a driving voltage of same amplitude, and the travelling wave can be excited efficiently by the equation (1).

Figure 4A:
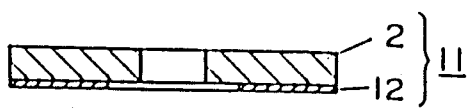
FIG.4(a), (b) and (c) are cross sectional view of a vibrating stator of a disk type ultrasonic motor of another embodiment, displacement distribution graph of the same and the plane view showing the constitution of electrodes of the same, respectively.
Figure 4B:
Figure 4C:
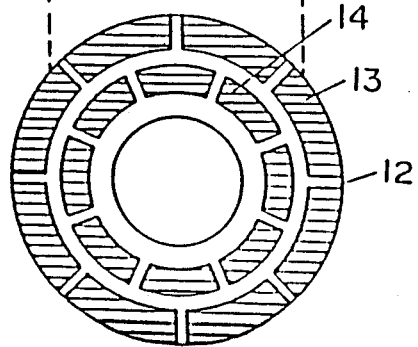

FIG.4 shows displacement distribution of a vibration stator 11 and an electrode configuration of a piezoelectric element 12 in another embodiment of an ultrasonic motor of the present invention. Electrode-group $A_1$ 13 is disposed outside a nodal circle of the flexural vibrations of the vibrating stator 4, and electrode-group $B_1$ 14 is disposed inside the nodal circle. Each electrode is constituted concentrically, and comprises small electrodes, wherein length in the circumferential direction corresponds to a half wavelength of the elastic travelling wave, respectively. And, the electrodes $A_1$ 13 and $B_1$ 14 are disposed with phase difference of 90° in position in the circumferential direction. An electrode on the surface which is opposite to the surface shown in that figure is a flat-electrode. Polarization directions of the each other adjacent small electrode parts which form the electrode-groups $A_1$ 13 and $B_1$ 14 are opposite with respect to thickness direction. When using, the electrode-groups $A_1$ 13 and $B_1$ 14 are short-circuited, respectively, and alternating voltages with phase difference by 90° are applied thereto, respectively, so that the flexural vibration which travels in circumferential direction is excited. Then, if respective electrode area are designed so as to make the electric charges induced in the electrode-groups $A_1$ 13 and $B_1$ 14 by the above-mentioned flexural vibration equal (i.e. by making mechanical impedances equal), the elastic travelling wave having the same amplitude can be excited by the same driving voltage, and the travelling wave can be excited efficiently by the equation (1). Now, an electric charge which is induced in a small electrode of the electrode-group $A_1$ 13 in FIG.4 and an electric charge which is induced in a corresponding small electrode of the electrode-group A 9 in FIG.3 are opposite in signs thereof. Therefore, if the amplitude of driving voltages are equal, rotating directions of the rotors are reversed.

FIG.5 shows displacement distribution of a vibrating element 15 and a electrode configuration of a piezoelectric element 16 in further another embodiment of an ultrasonic motor of the present invention. Electrode-group $A_2$ 17 is disposed outside a nodal circle of flexural vibration of the vibrating stator 4, and electrode-groups $A_3$ 18 and $B_2$ 19 are disposed inside the nodal circle. The three electrode-groups are constituted concentrically, and comprise small electrodes, wherein length in the circumferential direction corresponds to a half wavelength of the elastic travelling wave. And, the electrode-groups $A_2$ 17 and $A_3$ 18 are disposed with the same phase in position in the circumferential direction, and the electrode groups $A_3$ 18 and $B_2$ 19 are disposed with phase difference of 90° in position in the circumferential direction. An electrode on the surface which is opposite to the surface shown in that figure is flat-electrode. Polarization directions of the each other adjacent small electrode parts which form the electrode-groups $A_2$ 17, $A_3$ 18 and $B_2$ 19 are opposite with respect to thickness direction. Signs of electric charge which are induced in the corresponding small electrodes in the electrode-groups $A_2$ 17 and $A_3$ 18 are opposite each other when the directions of polarization are same, and therefore, the directions of polarization are made opposite as shown in that figure. Therefore, when using, the electrode-groups $A_2$ 17, $A_3$ 18 and $B_2$ 19 are short-circuited, respectively, and alternating voltages with phase difference by 90° are applied thereto, respectively, so that the flexural vibration which travels in the circumferential direction is excited.

Now, by designing the respective electrode areas are designed so as to make a sum of electric charge in the electrode-groups $A_2$ 17 and $A_3$ 18 and an electric charge in the electrode-group $B_2$ 19 by the above-mentioned flexural vibration equal (i.e. by making mechanical impedances equal), the elastic travelling wave having the same amplitude can be excited by the driving voltage of same amplitude, and the travelling wave can be efficiently excited by the equation (1). By this embodiment, since the electrodes can be constituted on the whole disk surface of the vibrating stator, the ultrasonic motor capable of taking out a large power is obtainable. Further, although the electrode-groups $A_2$ 17 and $A_3$ 18 are used with the same phase, the electrode-groups $A_2$ 17 and $B_2$ 19 can be used similarly with same phase.

In the above-mentioned embodiment, although only the mechanical impedances are made equal in two driving electrode-groups, if electrical impedances are also made equal, the elastic travelling wave can be excited further efficiently by driving voltages which have same amplitude and have phase difference of 90°.

FIG.6 is a cross sectional view of the vibrating stator 4 in the circumferential direction for explaining use of the projections 3. In the figure, NL is a neutral line of the flexural vibration of the vibrating stator 4, h is a distance from the neutral line NL to a surface of the vibrating stator 4, and a speed of the rotor 7 is in proportion to the amplitude of the travelling wave of the flexural vibration and the distance h. Therefore, to make the speed of the rotor 7 high, the amplitude of the flexural vibration or the distance h should be made large. However, since an upper limit of the flexural vibration is determined by a fracture limit of the piezoelectric element 1, when increase of rotating speed is intended further high, the distance h between the neutral line NL and the surface of the vibrating stator 4 should be made large. In the example shown in that figure, to make the distance h large without making a flexural rigidity of the flexural vibration in the travelling direction large, the projections 3 are provided; consequently, the distance h is enlarged to $h_1$ without largely changing the neutral line NL. And, the speed of the rotor 7 increases $h_1/h$ times in comparison with the case having no projections 3.

Figure 7:
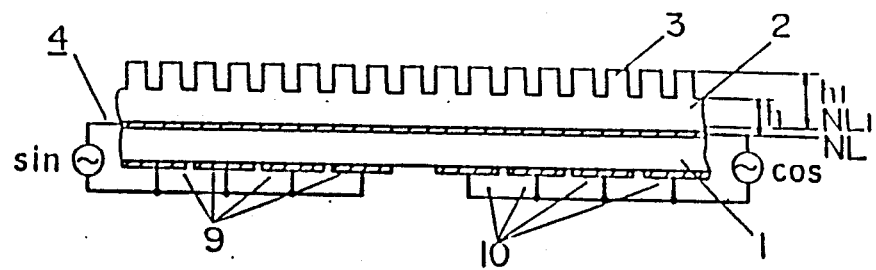
FIG.7 is a cross sectional view showing driving state of the main part of the vibrating stator of the embodiment in accordance with the present invention.
Figure 7A:
Figure 7B:

FIG.7 is a figure of simplified cross-sectional view of the projections and the vibrating stator for showing two sets of standing waves for explaining of a positioning regulation and numeral restriction of the projections. As afore-described, although two electrode-groups which have phase difference of 90° in position are disposed concentrically, here, to make the operation easy to understand they are drawn as if they are on the same line. That is to say, the electrode-groups A and B comprise a small electrodes which corresponds to a half wavelength of the travelling wave, and they are short-circuited at the time of driving as shown in the figure, respectively, and they are driven by voltages having phase difference of 90° of time (for example sine wave and cosine wave), respectively. Waves which are drawn below the vibrating stator 4 show standing waves of the flexural vibration excited by the electrode-groups A and B. In the projections 3 of the elastic element 2, thickness of the elastic element becomes equivalently thick, and thereby the flexural rigidity becomes large. When the loops of the standing waves of the flexural vibration which are excited by the electrode-groups A and B, come to the part of the projections, the flexural vibration become difficult to be excited; therefore, to drive efficiently, there should be no projections 3 at the loops of both standing waves. Further, by making relations of positions of the projections 3 seen from the two standing waves constant, mechanical impedances seen from two driving terminals can be made equal, so that a number of the projections within one wavelength becomes a multiple of four by the restriction. This is also the condition which can make the relations of positions of the projections seen from all small electrodes constant. This figure shows the relations of positions between the two standing waves and the projections at a time when this condition was satisfied.

NL of FIG.7 is a neutral line before providing of the projections 3, h is a distance to the surface of the elastic element, $NL_1$ is a neutral line after providing the porjections 3, $h_1$ is a distance to the surface of the elastic element, and, an increase of distance to the surface of the elastic element is larger than a change of position of the neutral line, so that an increase of rotation speed is obtainable. Then, when a resonance frequency of the vibrating stator 2 is close to that of the projective element 3, the projections 3 moves independently, so that the resonance frequency of the projections 3 must be made sufficiently lower than the resonance frequency of the vibrating stator 2.

Figure 8:
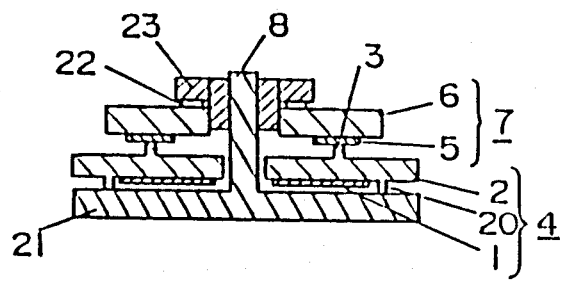
FIG.8 is a cross sectional view of the ultrasonic motor of a more concrete embodiment in accordance with the present invention.

FIG.8 is a cross-sectional view of an ultrasonic motor which shows an embodiment of a position-fixing of the vibrating stator. Projections 20 are disposed on a nodal of vibration of the vibrating stator 4, and the vibrating stator 4 is fixed on a fixed stand 21 via the projections 20. 22 is a leaf spring for putting the rotor 7 with pressure on the vibrating stator 4, which is held by a bearing 23. When the travelling wave of the flexural vibration is excited in the vibrating stator 4, the rotor 7 is driven by friction forces, thereby to rotate around the rotation shaft 8. The position-fixing of the vibrating stator 4 can also be made via an internal circumference of the vibrating stator 4 where the amplitude of vibration becomes small.

According to the present invention, an ultrasonic motor having high efficiency is obtainable, and a motor which is very suitable for the requirement of compact size and high efficiency, for instance, for lens-driving of a video camera or a driving motor of a printer.

While the invention has been described in connection with what is presently considered to be most practical and preferred embodiments, it is to be understood that the invention is not limited to the disclosed embodiment but is intended to cover various modifications and equivalent arrangements included within the spirit and scope of the appended claims.

We claim:

1. An ultrasonic motor that inputs two ac voltages having a 90° phase difference to cause rotation comprising:
   a rotation shaft;
   rotor means for rotating around said rotation shaft; and
   vibrating stator means for generating an elastic traveling wave so that frictional forces cause rotation of said rotor means, said vibrating stator means including:
   a disk shaped piezoelectric element attached at its center to said rotation shaft, a disk shaped elastic member attached at one side to one side of said disk shaped piezoelectric element shaft, a plurality of projections, said plurality being a multiple of four times said wavelength of said elastic travelling wave, attached to another side of said disk shaped elastic member in a circular configuration at regular intervals that correspond to loops of flexural vibrations and positioned in the radial direction to avoid loops of standing waves that produce rotation in a circumferential direction, said plurality of projections touching said rotor means, and a plurality of small driving electrodes attached to another side of said piezoelectric element and disposed in at least two concentric electrode groups, each small driving electrode being one-half wavelength of said elastic travelling wave in the circumferential direction, one of said electrode groups being shifted in the circumferential direction one-quarter wavelength of said elastic traveling wave with respect to the other electrode group in such a manner that a radial boundary of each small electrode within one electrode group corresponds to a center of a circumferential boundary of a small driving electrode that is part of the other electrode group and in which mechanical impedances seen from said two electrode groups are made equal using predetermined radial widths, each electrode group inputting one of said ac voltages to produce vibration modes of second order or higher in radial direction and flexural vibration modes of third order or higher in circumferential direction in which standing waves of two flexural vibrations cause said elastic traveling wave and result in vibration of said disk shaped elastic member and rotation of said rotor means.

2. An ultrasonic motor according to claim 1 wherein said two electrode groups are disposed inside a nodal circle of flexural vibrations.

3. An ultrasonic motor according to claim 1 wherein one of said two electrode groups are disposed inside a nodal circle of said flexural vibrations and the other electrode group is disposed outside said nodal circle of flexural vibrations.

4. An apparatus according to claim 1 wherein said plurality of small driving electrodes are disposed to form first, second and third concentric circular electrode groups in which said first and second electrode groups are disposed inside a nodal circle of flexural vibrations and said third electrode group is disposed outside said nodal circle of flexural vibrations, said third electrode group being shifted in the circumferential direction one-quarter wavelength of said elastic traveling wave with respect to said first and second electrode groups in such a manner that a radial boundary of each small electrode within said first and second electrode groups correspond to a center of a circumferential boundary of a small driving electrode of said third electrode group and a radial boundary of each small electrode within said third electrode group corresponds to a center of a circumferential boundary of said small driving electrodes of said first and second electrode groups.

5. An ultrasonic motor according to claim 1 wherein a lowest resonant frequency of said projections is higher than a resonant frequency of said flexural vibrations of said vibrating stator means.

6. An ultrasonic motor according to claim 1 wherein said vibrating stator means is fixed in position with respect to a nodal circle part of travelling waves of said flexural vibrations or an internal circumference of said vibrating stator means.

* * * * *